(12) United States Patent
Salter et al.

(10) Patent No.: US 12,077,059 B2
(45) Date of Patent: Sep. 3, 2024

(54) SYSTEMS AND METHODS FOR ASSISTING A BATTERY ELECTRIC VEHICLE EXECUTE A CHARGING OPERATION AT A BATTERY CHARGING LOT

(71) Applicant: Ford Global Technologies, LLC, Dearborn, MI (US)

(72) Inventors: Stuart Salter, White Lake, MI (US); Pietro Buttolo, Dearborn Heights, MI (US); Annette Huebner, Highland, MI (US); David Kennedy, Dearborn, MI (US); Hussein Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 382 days.

(21) Appl. No.: 17/467,605

(22) Filed: Sep. 7, 2021

(65) Prior Publication Data

US 2023/0076816 A1    Mar. 9, 2023

(51) Int. Cl.
*B60L 53/36* (2019.01)
*B60L 53/18* (2019.01)
(Continued)

(52) U.S. Cl.
CPC .............. *B60L 53/36* (2019.02); *B60L 53/18* (2019.02); *B60L 53/66* (2019.02); *B60W 30/06* (2013.01);
(Continued)

(58) Field of Classification Search
CPC ........... B60L 2240/622; B60L 2250/16; B60L 2260/32; B60L 53/16; B60L 53/18;
(Continued)

(56) References Cited

U.S. PATENT DOCUMENTS 10,139,238 B2 *  11/2018  Widmer .............. G01C 21/3635
10,759,298 B2 *   9/2020  Wang ...................... B60L 58/21
(Continued)

OTHER PUBLICATIONS

Mia Yamauchi, "How Wireless EV Charging Works For Tesla Models", Plugless Power, Mar. 12, 2021, seven pages.
Jennie Morton, "EV Charging Stations and Facility Management", www.buildings.com/articles/31423, Buildings Magazine, Jun. 19, 2012, 11 pages.

*Primary Examiner* — Babar Sarwar
(74) *Attorney, Agent, or Firm* — Emily Drake; Eversheds Sutherland (US) LLP

(57) ABSTRACT

The disclosure generally pertains to systems and methods for assisting a battery electric vehicle (BEV) execute a battery charging operation. In an example method, a processor of a battery charging advisory system in a BEV obtains information about a battery charging lot and evaluates the information to identify a battery charging station having a first charging cable that includes a first type of plug which is compatible for coupling to a charging port of the BEV. The processor may then identify a location of the charging port on the BEV and uses this information to determine an orientation of the BEV with respect to the battery charging station. The processor then provides an advisory for maneuvering the BEV into a position that allows coupling of the first charging cable of the battery charging station to the charging port of the BEV.

15 Claims, 6 Drawing Sheets

(51) Int. Cl.
*B60L 53/66* (2019.01)
*B60W 30/06* (2006.01)
*B60W 50/14* (2020.01)
*B60W 60/00* (2020.01)
*H02J 7/00* (2006.01)

(52) U.S. Cl.
CPC .......... *B60W 50/14* (2013.01); *B60W 60/001* (2020.02); *H02J 7/00045* (2020.01); *H02J 7/0013* (2013.01); *H02J 7/0042* (2013.01); *B60W 2050/146* (2013.01)

(58) Field of Classification Search
CPC .......... B60L 53/36; B60L 53/37; B60L 53/66; B60W 2050/146; B60W 30/06; B60W 50/14; B60W 60/001; H02J 7/00045; H02J 7/0013; H02J 7/0042; Y02T 10/70; Y02T 10/7072; Y02T 90/12; Y02T 90/14
See application file for complete search history.

(56) References Cited

U.S. PATENT DOCUMENTS

| | | | |
|---|---|---|---|
| 2012/0109519 A1* | 5/2012 | Uyeki | B60L 53/68 |
| | | | 701/426 |
| 2013/0057209 A1* | 3/2013 | Nergaard | B60L 1/003 |
| | | | 320/109 |
| 2014/0074523 A1* | 3/2014 | Turner | G06Q 10/02 |
| | | | 705/5 |
| 2015/0073642 A1* | 3/2015 | Widmer | G01C 21/3635 |
| | | | 701/22 |
| 2018/0170202 A1* | 6/2018 | Kim | B60H 1/00778 |
| 2019/0275892 A1* | 9/2019 | Williams | B60L 53/35 |
| 2020/0350775 A1* | 11/2020 | Penilla | H02J 7/0049 |
| 2022/0097530 A1* | 3/2022 | Gagas | H02P 29/68 |
| 2022/0126701 A1* | 4/2022 | Gagas | B60L 53/24 |
| 2022/0332256 A1* | 10/2022 | Braun | B60R 5/044 |
| 2022/0393491 A1* | 12/2022 | Zhang | H02J 7/0013 |

* cited by examiner

SYSTEMS AND METHODS FOR ASSISTING A BATTERY ELECTRIC VEHICLE EXECUTE A CHARGING OPERATION AT A BATTERY CHARGING LOT

BACKGROUND

A person seeking to fill up at a gasoline pump typically has to remember the position of the tank on the vehicle prior to pulling up at the pump so as to avoid the hassle of having to turn the vehicle around if the gas tank is located on the wrong side with respect to the pump. Similar issues apply when the vehicle is a battery electric vehicle pulling up at a battery charging station for charging a battery of the vehicle. The driver has to not only remember to pull up to the battery charging station correctly but has to also ensure that the charging cable has a charging plug that is compatible with a battery charging port of the vehicle. It is therefore desirable to provide a solution that may assist a driver of a battery electric vehicle when attempting to perform a battery charging procedure at a battery charging station.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
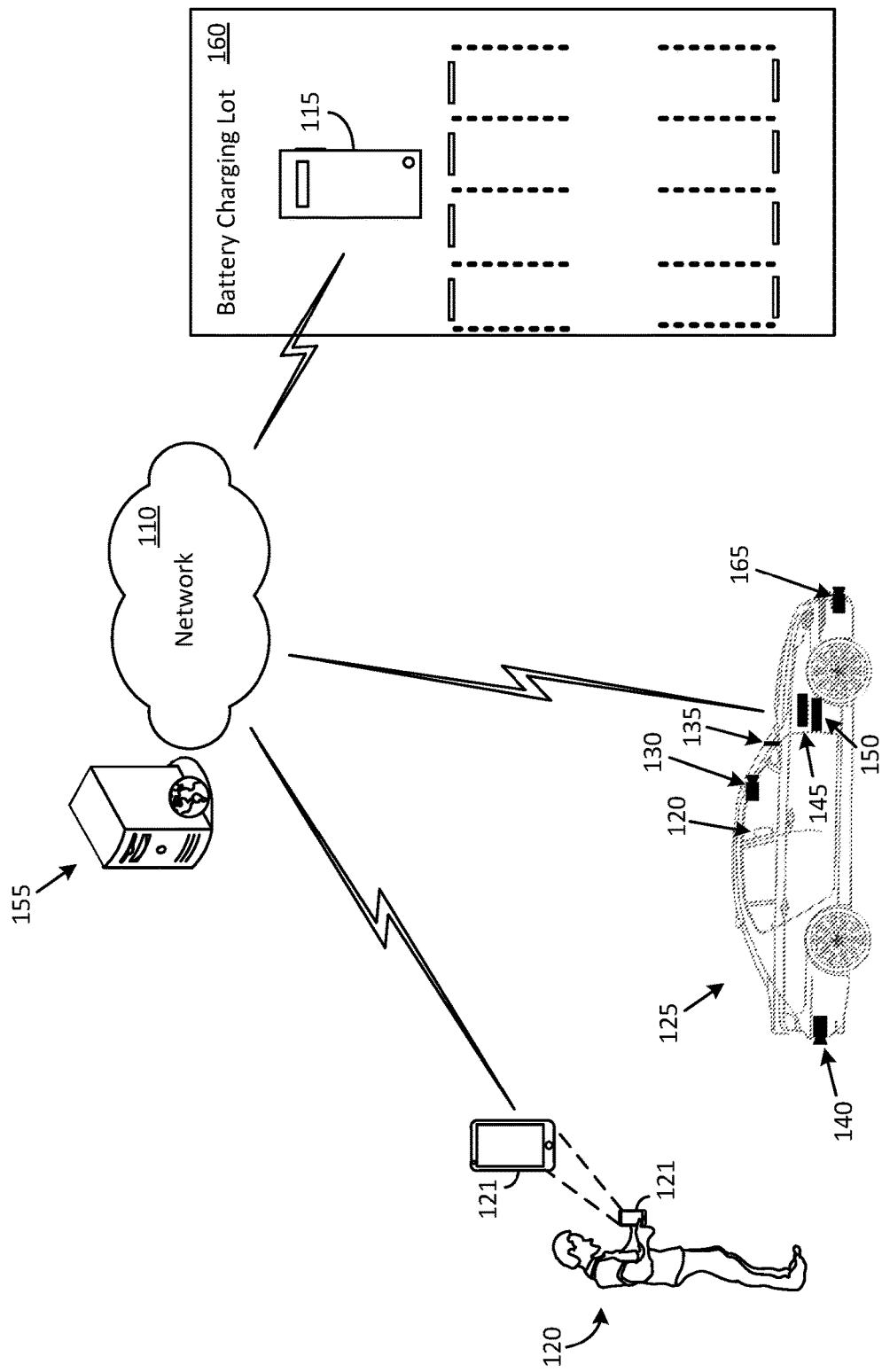
FIG. 1 illustrates an example configuration involving the use of a battery charging advisory system in accordance with an embodiment of the disclosure.

In terms of a general overview, certain embodiments described in this disclosure are directed to systems and methods for assisting a battery electric vehicle (BEV) execute a battery charging operation. In an example method, a processor of a battery charging advisory system in a BEV or a server over a network obtains information about a battery charging lot and evaluates the information to identify a battery charging station having a first charging cable that includes a first type of plug which is compatible for coupling to a battery charging port of the BEV. The processor may then identify a location of the charging port on the BEV and uses this information to determine an orientation of the BEV with respect to the battery charging station. The processor then provides an advisory for maneuvering the BEV into a position that allows coupling of the first charging cable of the battery charging station to the charging port of the BEV.

In an example scenario, an impediment, such as, for example, a snowdrift, or another vehicle, may impede the BEV from moving into an optimal position to allow for coupling of the first charging cable of the battery charging station to the charging port of the BEV. In this scenario, the processor of the battery charging advisory system may issue another advisory that recommends a re-orientation of the BEV in a position that allows coupling of the first charging cable of the battery charging station to the charging port of the BEV.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the described example embodiments but should be defined only in accordance with the claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. More particularly, it must be understood that the description with respect to battery charging stations in a battery charging lot does not in any way preclude implementation of the disclosure upon battery charging stations that are located elsewhere, such as, for example, in a parking space of a private or a public entity.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "electric vehicle" and the phrase "battery electric vehicle" (BEV) may be used interchangeably in this disclosure and must be understood to refer to any type of vehicle that operates an electric motor by use of a rechargeable battery. The word "battery" as used herein encompasses a single battery as well as a set of batteries that are interconnected to form a battery bank. The word "advisory" as used herein refers to any of various forms of communication such as, for example, a communication via a display screen of a device built into a vehicle or carried by a person using a vehicle. In one case, the advisory may instruct a driver of a vehicle to take responsive action (when the vehicle is a driver-operated vehicle). In another case, the advisory may be provided by a first processor in a battery charging advisory system to a second processor of a vehicle computer in the form of a command that instructs the second processor to take suitable action (when the vehicle is an autonomous vehicle). The word "information" must be understood as referring to any type of communication means such as, for example, digital data carried over a communication medium (wired, wireless, optical, etc.), analog data, and images. It must be understood that words such as "implementation," "scenario," "case," "application," and "situation" are to be understood as examples in accordance with the disclosure. It should be understood that the word "example" as used herein is intended to be non-exclusionary and non-limiting in nature.

FIG. 1 illustrates an example configuration involving the use of a battery charging advisory system in accordance with the disclosure. In an example embodiment, the battery charging advisory system includes a computer that is located in a battery electric vehicle (BEV) 125. In another example embodiment, the battery charging advisory system includes a computer that is located outside a BEV 125, such as, for example, in a server computer 115 or a cloud computer 155.

The BEV 125 may be any of various types of vehicles such as, for example, a sedan, a sports utility vehicle, a truck, a van, a bus, a driver-operated vehicle, a semi-autonomous vehicle, or an autonomous vehicle. In the illustrated example, the BEV 125 is operated by a driver 120. In another example, the BEV 125 is an autonomous vehicle. The BEV 125 can include components such as, for example, a vehicle computer 145, an infotainment system 135, a battery charging advisory system 150, and various sensors and detection devices.

The vehicle computer 145 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.).

In the illustrated scenario, the battery charging advisory system 150 is configured to execute various functions associated with providing to the driver 120 (or, in the case of an autonomous vehicle, to the vehicle computer 145), advice on how to maneuver the BEV 125 into a position for executing a battery charging operation at a battery charging station. The battery charging station may be located in a battery charging lot 160, which can be a part of a parking lot that accommodates other types of vehicles, including gasoline vehicles. As a part of the configuration, the battery charging advisory system 150 may be communicatively coupled to the vehicle computer 145 and the infotainment system 135 via wired and/or wireless connections. More particularly, in one implementation, the battery charging advisory system 150 is communicatively coupled to the vehicle computer 145 and the infotainment system 135 via a vehicle bus that uses a controller area network (CAN) bus protocol, a Media Oriented Systems Transport (MOST) bus protocol, and/or a CAN flexible data (CAN-FD) bus protocol. In another implementation, the communications may be provided via wireless technologies such as Bluetooth®, Ultra-Wideband (UWB), cellular, Wi-Fi, Zigbee®, or near-field-communications (NFC).

The infotainment system 135 can include elements such as, for example, a radio, an MP3 player, a global positioning system (GPS) device, a clock, and a display screen. The infotainment system 135 can further include a graphical user interface (GUI) or a human machine interface (HMI) that is displayed on the display screen. The GUI or HMI accepts input from an occupant of the BEV 125 (the driver 120, for example), and/or displays various items pertaining to battery charging operations such as, for example, messages, advisories, directives and/or warnings. An example item that may be displayed on the display screen of the infotainment system 135 can be an advisory provided by the battery charging advisory system 150 instructing the driver 120 to park the BEV 125 in a specific manner with respect to a battery charging station.

The battery charging advisory system 150 may be configured to communicate via a network 110 with various devices such as, for example, the server computer 115 and the cloud computer 155. The server computer 115 and the cloud computer 155 may be configured to provide to the battery charging advisory system 150, information about various battery charging stations located in the battery charging lot 160. The information can include, for example, the various types of battery charger stations available for use (fast charger, regular charger, etc.), the location of various battery charger stations in the battery charging lot 160 (landmarks, signs, GPS location coordinates, etc.), physical characteristics of various battery charger stations in the battery charging lot 160 (type of connector plug, length of charging cable, etc.), and charging fees. In some applications, the battery charging advisory system 150 may be further configured to communicate with various objects located outside the BEV 125 by using vehicle-to-infrastructure (V2I) communications. In an example implementation, the battery charging advisory system 150 may use V2I communication to communicate with the server computer 115 via a computer located in a smart pedestal at an entrance of the battery charging lot 160.

The network 110 may include any one, or a combination of networks, such as a local area network (LAN), a wide area network (WAN), a telephone network, a cellular network, a cable network, a wireless network, and/or private/public networks such as the Internet. For example, the network 110 may support communication technologies such as Wi-Fi, Wi-Fi direct, Ultra-Wideband (UBW), machine-to-machine communication, and/or man-to-machine communication.

At least one portion of the network 110 includes a wireless communication link (a WiFi link, for example), that allows the battery charging advisory system 150 and/or the infotainment system 135 of the BEV 125 to communicate with the server computer 115 and/or the cloud computer 155. The network 110 may also support a wireless communication link (a cellular link, for example) that allows the server computer 115 and/or the cloud computer 155 to communicate with a personal communication device 121 carried by the driver 120 of the BEV 125 (either when standing outside the BEV 125 or seated inside the BEV 125). The personal communication device 121 can be any of various devices such as, for example, a smartphone, a tablet computer, a phablet (phone plus tablet), a wearable computer, or a laptop computer.

The BEV 125 may include various sensors and detection devices that are communicatively coupled to the battery charging advisory system 150 and/or the vehicle computer 145. A few examples of such sensors and detection devices may include a camera, an ultrasonic sensor, a radar sensor, a global positioning system (GPS), a battery charge level sensor, a vehicle speed sensor, and/or a vehicle locator device. In the illustrated example, the detection devices include a camera 130, a camera 140, and a camera 165. The camera 130, which can be mounted on a rear-view mirror or a dashboard of the BEV 125, is arranged to capture images of objects located in front of the BEV 125. The camera 140, which can be mounted on a rear bumper of the BEV 125, is arranged to capture images of objects located behind the BEV 125 and may also be arranged to capture images of painted markings such as, for example, lines defining a parking spot. The camera 165, which can be mounted on a front bumper of the BEV 125, is arranged to capture images of objects such as, for example, lines defining a parking spot. One or more of the camera 140, the camera 140, and/or the camera 165 can be a digital camera that captures digital pictures, a video camera that captures video clips, or a video camera that produces streaming video. In some applications one or more of the camera 140, the camera 140, and/or the camera 165 can be a night-vision camera that captures images and/or video in low light conditions.

In one implementation, the camera 140, the camera 140, the camera 165 and additional cameras (if required) may be arranged to provide a 360° view around the BEV 125, This arrangement allows image capture of multiple objects all around the BEV 125. The images may be conveyed to the battery charging advisory system 150. The battery charging advisory system 150 may evaluate these images for various purposes such as, for example, to identify a location of a battery charging station, to identify physical characteristics of a battery charging station (location of a charging cable, for example), to identify a landmark in the battery charging lot 160 (for identifying a specific battery charging station, for example), and/or to identify lines painted on the ground near a battery charging station.

In an exemplary embodiment in accordance with the disclosure, the battery charging advisory system 150 may receive a sensor signal from a battery sensor that indicates that a charge level in a battery of the BEV 125 has dropped below a threshold charge level. The battery charging advisory system 150 may respond to the sensor signal by determining a mileage than can be obtained from the remaining charge in the battery and using the mileage information to identify a battery charging station that can be reached by the BEV 125. Identifying the battery charging station may be carried out in cooperation with devices such as a GPS system of the BEV 125, and based on battery charging station location information stored, for example, in a database of devices such as, for example, the battery charging advisory system 150, the vehicle computer 145, and/or the cloud computer 155.

In an example scenario, the battery charging advisory system 150 identifies the battery charging lot 160 as suitable for charging the battery, and may advise the driver 120 of the BEV 125 to drive to the battery charging lot 160. The advice may be provided via the infotainment system 135. In an example implementation, the battery charging advisory system 150 may provide navigation guidance via the infotainment system 135 to the driver 120 for traveling to the battery charging lot 160.

In another example scenario where the BEV 125 is an autonomous vehicle, the battery charging advisory system 150 identifies the battery charging lot 160 as suitable for charging the battery, and may cooperate with the vehicle computer 145, to autonomously drive the BEV 125 to the battery charging lot 160.

When approaching the battery charging lot 160 (as can be determined, for example, by GPS location information received from a GPS device in the BEV 125), the battery charging advisory system 150 may evaluate images received from the camera 130, for example, to identify an entrance of the battery charging lot 160.

The battery charging advisory system 150 may then transmit a query to the server computer 115 (and/or the cloud computer 155) seeking information about the battery charging stations located in the battery charging lot 160. The server computer 115 may be located on the premises of the battery charging lot 160, such as, for example, in an office building or in a beacon system mounted on an infrastructure element (pillar, sidewalk enclosure, etc.).

The server computer 115 (and/or the cloud computer 155) may respond to the query by providing to the battery charging advisory system 150, information such as, for example, the various types of battery charger stations available for use at the battery charging lot 160 (fast charger, regular charger, etc.), the location of various battery charger stations in the battery charging lot 160 (landmarks, signs, GPS location coordinates, etc.), physical characteristics of various battery charger stations in the battery charging lot 160 (type of connector plug, length of charging cable, etc.), and charging fees.

The battery charging advisory system 150 may display some or all of this information on the display of the infotainment system 135 and/or on the personal communication device 121 when the BEV 125 is a driver-operated vehicle. The driver 120 may examine the displayed information and take responsive action. In an example case, the driver 120 may enter into the GUI of the infotainment system 135, or into the personal communication device 121, one or more questions. A first example question may pertain to information about, and/or location of, a charging port in the BEV 125. The battery charging advisory system 150 may respond to the first question by obtaining information about the BEV 125 from sources such as, for example, the vehicle computer 145, a computer in a dealership that sells vehicles such as the BEV 125, and/or a computer of a manufacturer that manufactured the BEV 125. The information can include, for example, a vehicle identification number (VIN) of the BEV 125, which may be used by the battery charging advisory system 150 to obtain information about the charging port on the BEV 125. The information about the charging port on the BEV 125 can include, for example, a location of the charging port (front portion of the BEV 125, rear panel on the driver side of the BEV 125, rear panel on the passenger side of the BEV 125, etc.), and a style of electrode layout and physical characteristics of the charging port (female connector that is compatible with a Type 1 charging plug, for example).

A second example question may pertain to items such as the type of battery charging station to select among the battery charging stations available at the battery charging lot 160, location information about a first battery charging station having a battery charging cable that is compatible with the charging port in the BEV 125, navigation guidance to travel to the first battery charging station, physical characteristics of the first battery charging station (fast charging, regular charging, charging cable length, etc.), charging fees, and/or availability information about the first battery station charging station that is compatible with the charging port in the BEV 125 (wait time, if occupied).

The battery charging advisory system 150 may respond to the second question by obtaining information about the battery charging lot 160 from sources such as, for example, the server computer 115 and/or the cloud computer 155. The information can include, for example, the various types of battery charging stations located in the battery charging lot 160, locations of the various battery charging stations, and availability of one or more battery charging stations battery charging stations. The battery charging advisory system 150 may evaluate the obtained information about the battery charging lot 160, particularly in view of the information about the BEV 125 (type of charging port on the BEV 125, location of the charging port on the BEV 125, current location of the BEV 125, etc.). Based on the evaluation, the battery charging advisory system 150 may provide an advisory to the driver 120 of the BEV 125 (on the infotainment system 135 and/or the personal communication device 121).

The advisory may include, for example, information about the availability (or lack of availability) of a battery charging station that is compatible with the charging port of the BEV 125, type of battery charging hardware (type of charging cable, type of charging plug, etc.), and charging fees. If the driver 120 decides to go forward with a battery charging operation, the battery charging advisory system 150 may provide navigation asssitance for the driver 120 to travel to a specific and compatible battery charging station, followed by guidance on how to maneuver the BEV 125 into a position adjacent to the battery charging station in a manner that would orient the BEV 125 for allowing the driver 120 to couple the charging cable of the battery charging station to the charging port of the BEV 125. In an example implementation, battery charging advisory system 150 may display a map or a graphical rendering of the battery charging lot 160 that may be used by the driver 120 to travel to a particular battery charging station. The battery charging advisory system 150 may also provide additional types of advice based on various example scenarios as described below. In another example implementation, the BEV 125 may be equipped to execute autonomous parking, which may be referred to in terms such as active park assist and valet mode of operation. In this case, the driver 120 may engage the auto-park feature and allow the BEV 125 to autonomously move into the position that allows the driver 120 to couple a charging cable of the battery charging station to the charging port in the BEV 125.

In an implementation where the BEV 125 is an autonomous vehicle, the battery charging advisory system 150 may cooperate with the vehicle computer 145 to move the BEV 125 autonomously to a specific and compatible battery charging station, followed by maneuvering of the BEV 125 into a position adjacent to the battery charging station in a manner that would orient the BEV 125 for allowing an automation element provided on the BEV 125, such as, for example, an articulated arm, to couple the charging cable of the battery charging station to the charging port of the BEV 125. The battery charging advisory system 150 may evaluate images captured by one or more cameras on the BEV 125 and/or sensor signals received from sensors such as, for example, a radar detector or an ultrasonic sensor, to execute the maneuvering operation and charging cable coupling operation.

Figure 2:
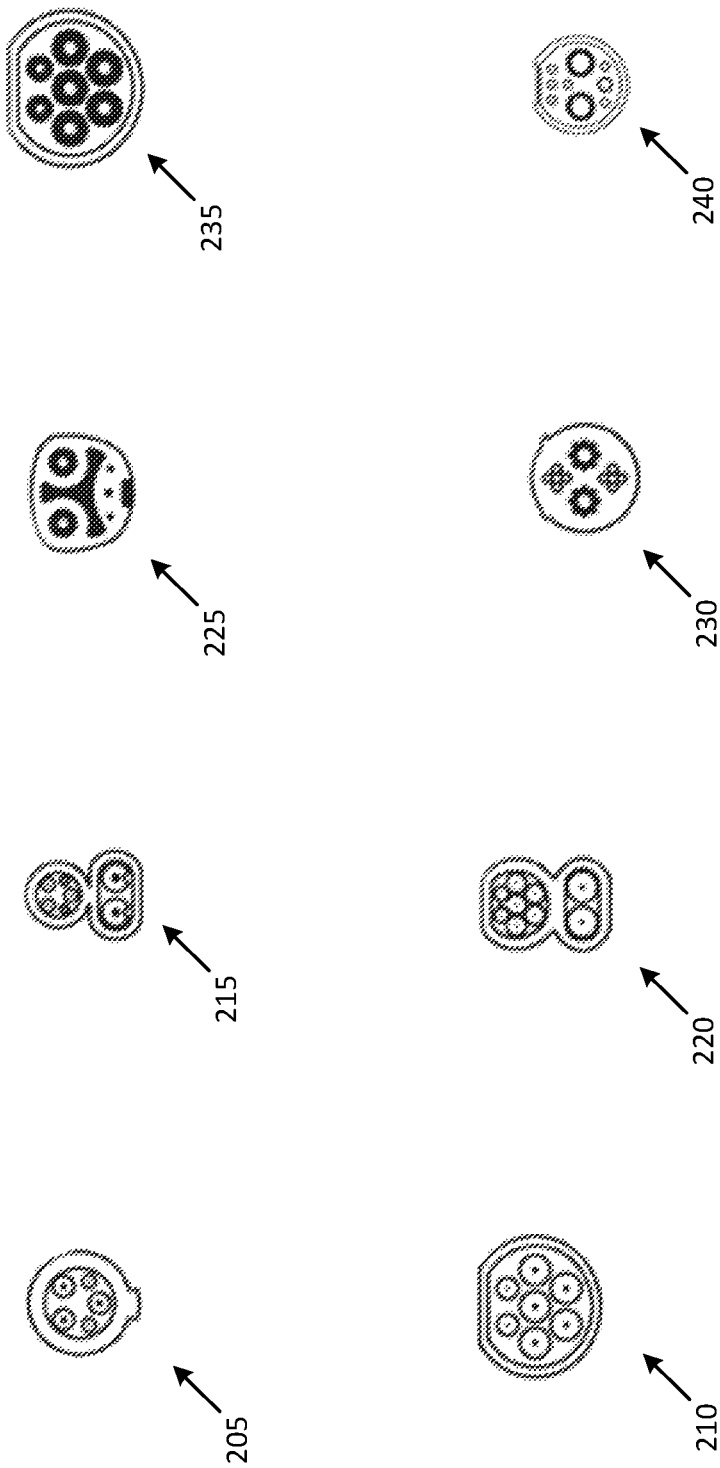
FIG. 2 shows a few examples of various types of plugs that may be provided on charging cables for use to charge a battery of a battery electric vehicle.

FIG. 2 shows a few examples of various types of plugs that may be provided on charging cables for use to charge a battery of the BEV 125. Plug 205 is generally referred to in popular usage as a Type 1 plug. Plug 210 is generally referred to in popular usage as a Type 2 plug. Plug 215 is generally referred to in popular usage as a CCS Combo T1 plug. Plug 220 is generally referred to in popular usage as a CCS Combo T2 plug. Plug 225 is generally referred to in popular usage as a Tesla® plug. Plug 230 is generally referred to in popular usage as a CHAdeMO plug. Plug 235 is generally referred to in popular usage as a GB/T AC plug. Plug 240 is generally referred to in popular usage as a GB/T DC plug.

Figure 3:
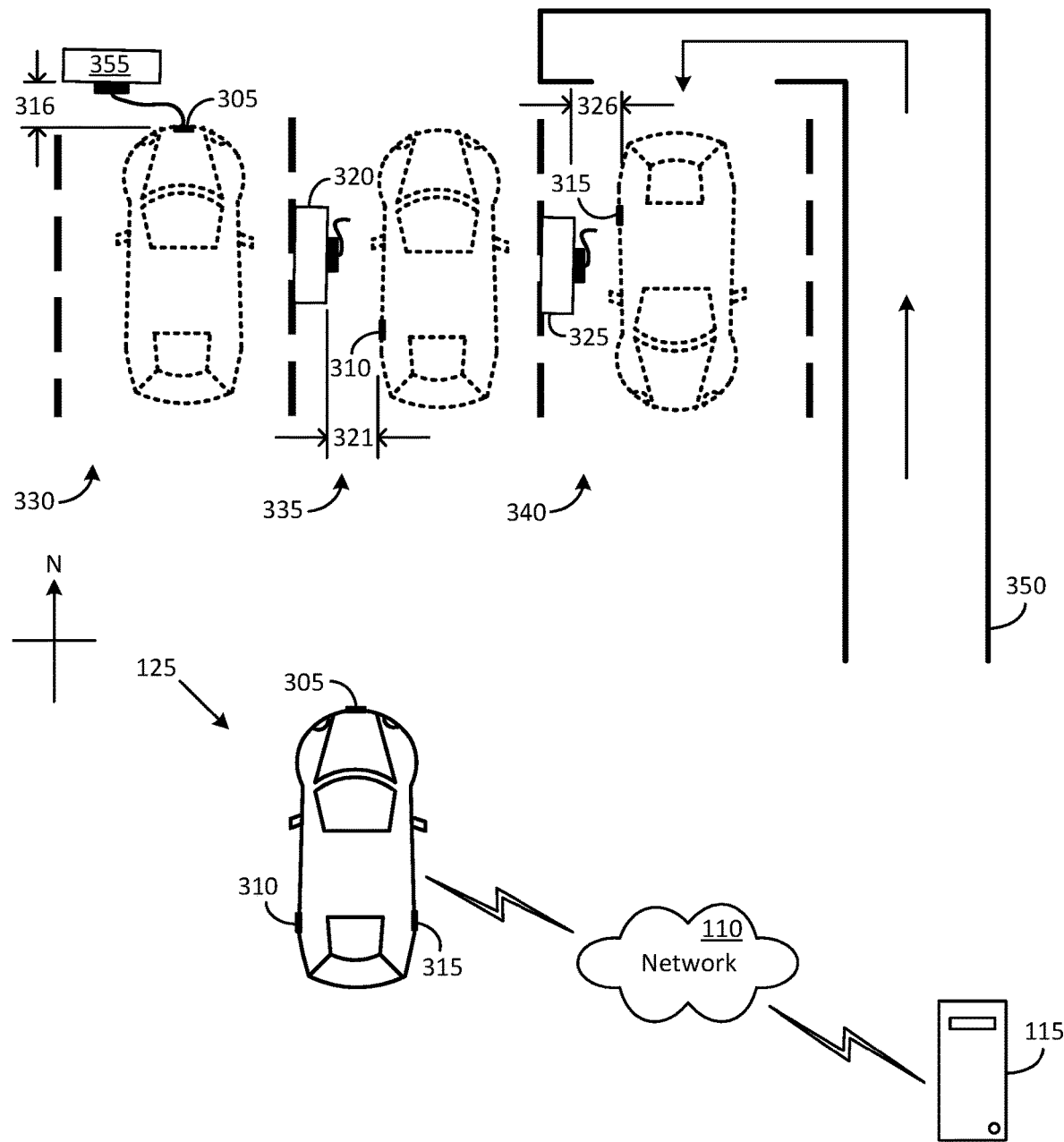
FIG. 3 illustrates a first example battery charging scenario in accordance with an embodiment of the disclosure.

FIG. 3 illustrates a first example battery charging scenario in accordance with an embodiment of the disclosure. The BEV 125 is illustrated to indicate three of various alternative locations at which a battery charging port can be provided. The battery charging port may have any of various types of electrode configurations that render the battery charging port compatible with various types of charging plugs.

In a first type of battery electric vehicle, a battery charging port 305 is located in a front portion of the vehicle (near the front bumper, for example). The battery charging port may be compatible, for example, with a Type 1 plug, such as the plug 205 referred to above. In a second type of battery electric vehicle, a battery charging port 310 is located on a rear panel on the driver side of the BEV 125. The battery charging port may be compatible, for example, with a Type 2 plug, such as the plug 210 referred to above. In a third type of battery electric vehicle, a battery charging port 315 is located on a rear panel on the passenger side of the BEV 125. The battery charging port may be compatible, for example, with a CHAdeMO plug, such as the plug 230 referred to above. Other types of battery electric vehicles may have charging ports located at other locations on the vehicle.

Upon arriving at the battery charging lot 160 (as illustrated in FIG. 3), the battery charging advisory system 150 may communicate with the server computer 115 (and/or the cloud computer 155) to obtain information about various battery charging stations located in the battery charging lot 160. The information can include, for example, the various types of battery charging stations available for use (fast charger, regular charger, etc.), the location of various battery charging stations in the battery charging lot 160 (landmarks, signs, GPS location coordinates, etc.), physical characteristics of various battery chargers in the battery charging lot 160 (type of connector plug, length of charging cable, etc.), and charging fees.

The battery charging advisory system 150 may also obtain information about the charging port on the BEV 125, such as, for example, a location of the charging port and a type of the charging port. The battery charging advisory system 150 may then evaluate the information about various battery charging stations located in the battery charging lot 160 in view of the information about the charging port on the BEV 125 to identify a specific battery charging station that may be used for charging the battery of the BEV 125.

In a first scenario, the BEV 125 is equipped with the battery charging port 305 and the battery charging advisory system 150 may identify the battery charging station 355 in a parking spot 330 as being compatible with the battery charging port 305 because the battery charging station 355 includes a battery charging cable having a first type of plug. The battery charging advisory system 150 may also determine that the battery charging station 355 is suitable for use based on evaluating other factors such as, for example, a length of the battery charging cable, a charging speed provided by the battery charging station 355, and/or an availability of the battery charging station 355. In some instances, some of these factors may render the battery charging station 355 unsuitable for use (insufficient length of charging cable, non-availability, etc.) and the battery charging advisory system 150 may identify an alternative battery charging station that may be used instead.

If the battery charging station 355 is found suitable for use, the battery charging advisory system 150 may provide to the driver 120 (via the infotainment system 135 and/or the personal communication device 121) or to the vehicle computer 145 (if the BEV 125 is an autonomous vehicle) an advisory on how to travel to the parking spot 330 335 (map, navigation instructions, landmarks, etc.) and maneuver the BEV 125 into a position that allows coupling of the battery charging cable of the battery charging station 355 to the battery charging port 305 of the BEV 125. In this example scenario, the instructions provided by the battery charging advisory system 150 can include orienting the front end of the BEV 125 in a north direction when parked in the parking spot 330 with the front bumper of the BEV 125 located within a maximum distance 316 from the battery charging station 355. The distance 316 may be calculated by the battery charging advisory system 150 such that the distance 316 is less than, or equal to, a length of the charging cable that is a part of the battery charging station 355.

In a second scenario, the BEV 125 is equipped with the battery charging port 310 and the battery charging advisory system 150 may identify the battery charging station 320 in a parking spot 335 as being compatible with the battery charging port 310 because the battery charging station 320 includes a battery charging cable having a second type of plug. The battery charging advisory system 150 may also determine that the battery charging station 320 is suitable for use based on evaluating other factors such as, for example, a length of the battery charging cable, a charging speed provided by the battery charging station 320, and/or an availability of the battery charging station 320. In some instances, some of these factors may render the battery charging station 320 unsuitable for use (insufficient length of charging cable, non-availability, etc.) and the battery charging advisory system 150 may identify an alternative battery charging station that may be used instead.

If the battery charging station 320 is found suitable for use, the battery charging advisory system 150 may provide to the driver 120 (via the infotainment system 135 and/or the personal communication device 121) or to the vehicle computer 145 (if the BEV 125 is an autonomous vehicle) an advisory on how to travel to the parking spot 335 (map, navigation instructions, landmarks, etc.) and maneuver the BEV 125 into a position that allows coupling of the battery charging cable of the battery charging station 325 to the battery charging port 315 of the BEV 125. In this example scenario, the instructions provided by the battery charging advisory system 150 can include orienting the front end of the BEV 125 in a north direction when parked in the parking spot 335 with the driver side rear panel of the BEV 125 located within a maximum distance 321 from the battery charging station 320. The distance 321 may be calculated by the battery charging advisory system 150 such that the distance 321 is less than, or equal to, a length of the charging cable that is a part of the battery charging station 320.

In a third scenario, the BEV 125 is equipped with the battery charging port 315 and the battery charging advisory system 150 may identify the battery charging station 325 in a parking spot 340 as being compatible with the battery charging port 315 because the battery charging station 325 includes a battery charging cable having a third type of plug. The battery charging advisory system 150 may also determine that the battery charging station 325 is suitable for use based on evaluating other factors such as, for example, a length of the battery charging cable, a charging speed provided by the battery charging station 325, and/or an availability of the battery charging station 320. In some instances, some of these factors may render the battery charging station 325 unsuitable for use (insufficient length of charging cable, non-availability, etc.) and the battery charging advisory system 150 may identify an alternative battery charging station that may be used instead.

If the battery charging station 325 is found suitable for use, the battery charging advisory system 150 may provide to the driver 120 (via the infotainment system 135 and/or the personal communication device 121) or to the vehicle computer 145 (if the BEV 125 is an autonomous vehicle) an advisory on how to travel to the parking spot 340 (map, navigation instructions, landmarks, etc.) and maneuver the BEV 125 into a position that allows coupling of the battery charging cable of the battery charging station 325 to the battery charging port 315 of the BEV 125. In this example scenario, the instructions provided by the battery charging advisory system 150 can include orienting the front end of the BEV 125 in a south direction when parked in the parking spot 340 with the passenger side rear panel of the BEV 125 located within a maximum distance 326 from the battery charging station 325. The distance 326 may be calculated by the battery charging advisory system 150 such that the distance 326 is less than, or equal to, a length of the charging cable that is a part of the battery charging station 325.

In a fourth example scenario, the BEV 125 may arrive at the battery charging lot 160 after a charge level of the battery in the BEV 125 has dropped below a threshold charge level. The low battery charge level may render the BEV 125 unable to travel beyond a threshold distance (500 yards, for example). In accordance with the disclosure, the battery charging advisory system 150 may inform the server computer 115 of the low battery level and seek a grant of a priority charging status. If the server computer 115 grants the priority charging status, the BEV 125 is allowed to travel on a priority basis to any compatible battery charging station that is available, even if another BEV is waiting in line to use the battery charging station. In an example scenario, the BEV 125 may be granted travel rights to travel along an emergency travel path to the battery charging station, which in the illustrated example, is along an emergency travel path 350 to the battery charging station 325. In one implementation, the emergency travel path may be pre-defined by the server computer 115. In another implementation, the emergency travel path may be created on a dynamic as-needed basis by the server computer 115.

In a fifth example scenario, the battery charging advisory system 150 may be unable to obtain information about the various battery charging stations in the battery charging lot 160 due to various reasons (older facility, rural facility, etc.). In this scenario, the driver 120 may seek the assistance of the battery charging advisory system 150 for some operations, such as, for example, to identify a location of the battery charging port on the BEV 125 (passenger side or driver side, for example) so as to pull up to a battery charging station with the correct orientation. Some other operational assistance that can be provided by the battery charging advisory system 150 is in terms of parking assistance where the battery charging advisory system 150 can provide guidance to the driver 120 to pull up to a battery charging station. The guidance may be provided, for example, as a graphic on the infotainment system 135 of the lines of a parking spot. The graphic, which may be generated on the basis of images captured by one or more cameras on the BEV 125 may include the lane markings of a parking spot with respect to the chassis of the BEV 125. The graphic, which may be dynamically updated to assist the driver 120 as the BEV 125 move into a parking spot, may be particularly useful when the BEV 125 is backed into the parking spot.

Figure 4:
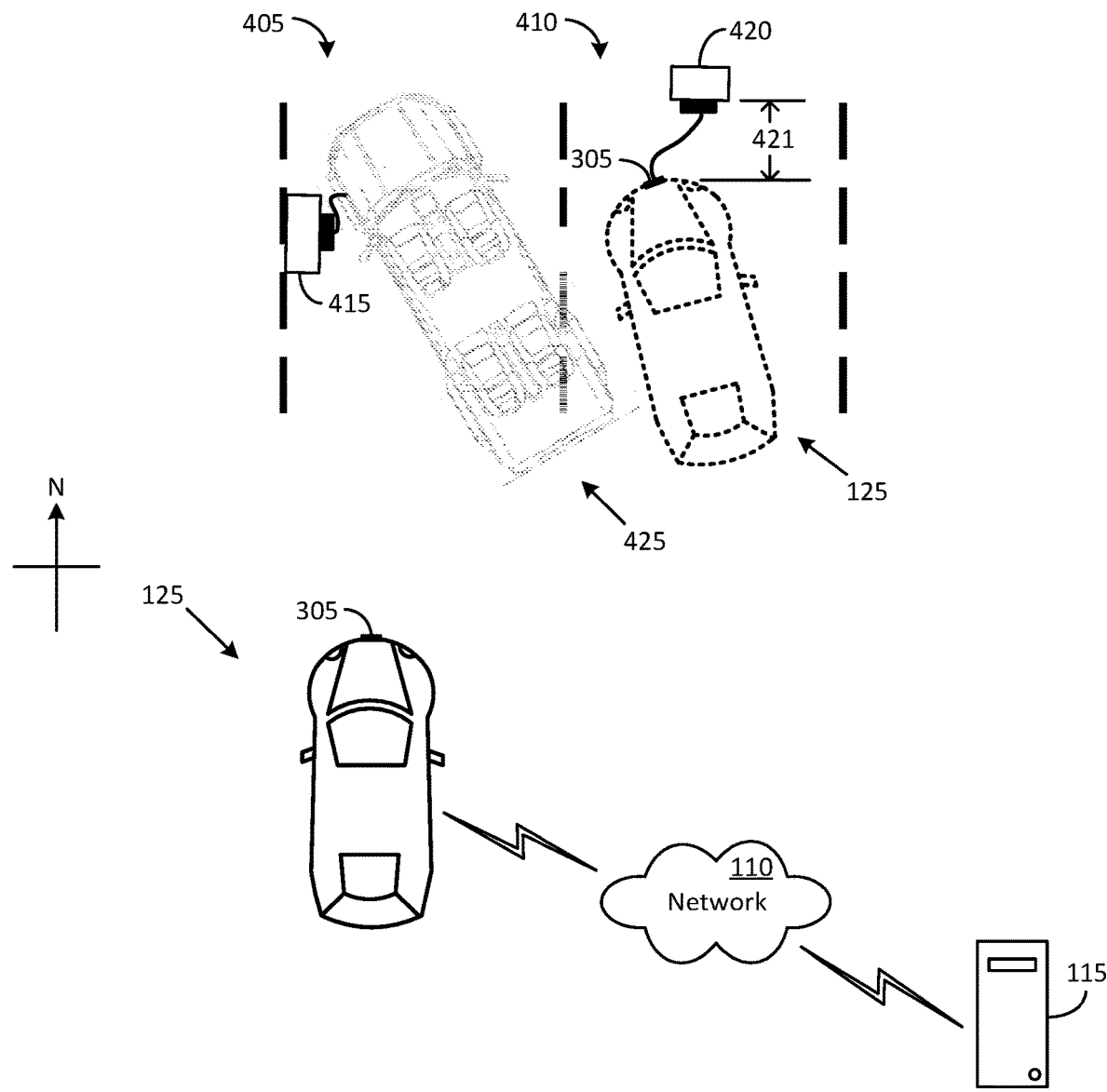
FIG. 4 illustrates a second example battery charging scenario in accordance with an embodiment of the disclosure.

FIG. 4 illustrates a second example battery charging scenario in accordance with an embodiment of the disclosure. In this scenario, the battery charging advisory system 150 may communicate with the server computer 115 (and/or the cloud computer 155) and identify a suitable battery charging station in the manner described above. In this example, the battery charging station 420 is determined to be suitable for charging the battery in the BEV 125.

Before, or during, travel to the parking spot 410, the battery charging advisory system 150 may evaluate images captured by one or more cameras on the BEV 125 and determine that entry into the parking spot 410 is impeded due to an impediment in the travel path of the BEV 125. The impediment in this example scenario, is a BEV 425 that is parked askew in parking spot 405 while obtaining battery charging service from a battery charging station 415. A rear portion of the BEV 425 is extending into the parking spot 410 in which the BEV 125 desires to park.

In this situation, the battery charging advisory system 150 may inform the server computer 115 of the impediment and seek redress. The redress may involve the server computer 115 communicating with a computer in the BEV 425 to advise a driver of the BEV 425 to reposition the BEV 425. If the driver refuses to do so, the server computer 115 may inform the battery charging advisory system 150 of the refusal.

The battery charging advisory system 150 may then evaluate images of the parking spot 410 and the battery charging station 420, and provide an advisory to the driver 120 of the BEV 125 for maneuvering the BEV 125 into the parking spot 410 in an orientation that allows coupling of the charging cable of the battery charging station 420 to the battery charging port 305 on the BEV 125. In one implementation, the battery charging advisory system 150 may provide the advisory in the form of a graphic on the display screen of the infotainment system 135. The graphic, which may be generated on the basis of images captured by one or more cameras on the BEV 125 may include the lane markings of the parking spot 410 with respect to the chassis of the BEV 125. The graphic, which may be dynamically updated to assist the driver 120 as the BEV 125 move into the parking spot 410, may be particularly useful when the BEV 125 is moved in reverse into the parking spot 410 (as may be done when the charging port is located elsewhere on the BEV 125).

In the illustrated scenario, the rear end of the BEV 125 is projecting into an adjacent parking spot and the distance 421 between the battery charging station 420 and the battery charging port 305 on the BEV 125 may be more than what would be optimal if the BEV 125 was parked in a manner such that the sides of the BEV 125 were parallel to the markings of the parking spot 410. The distance 421 is calculated to be less than a length of a charging cable that is a part of the battery charging station 420.

Figure 5:
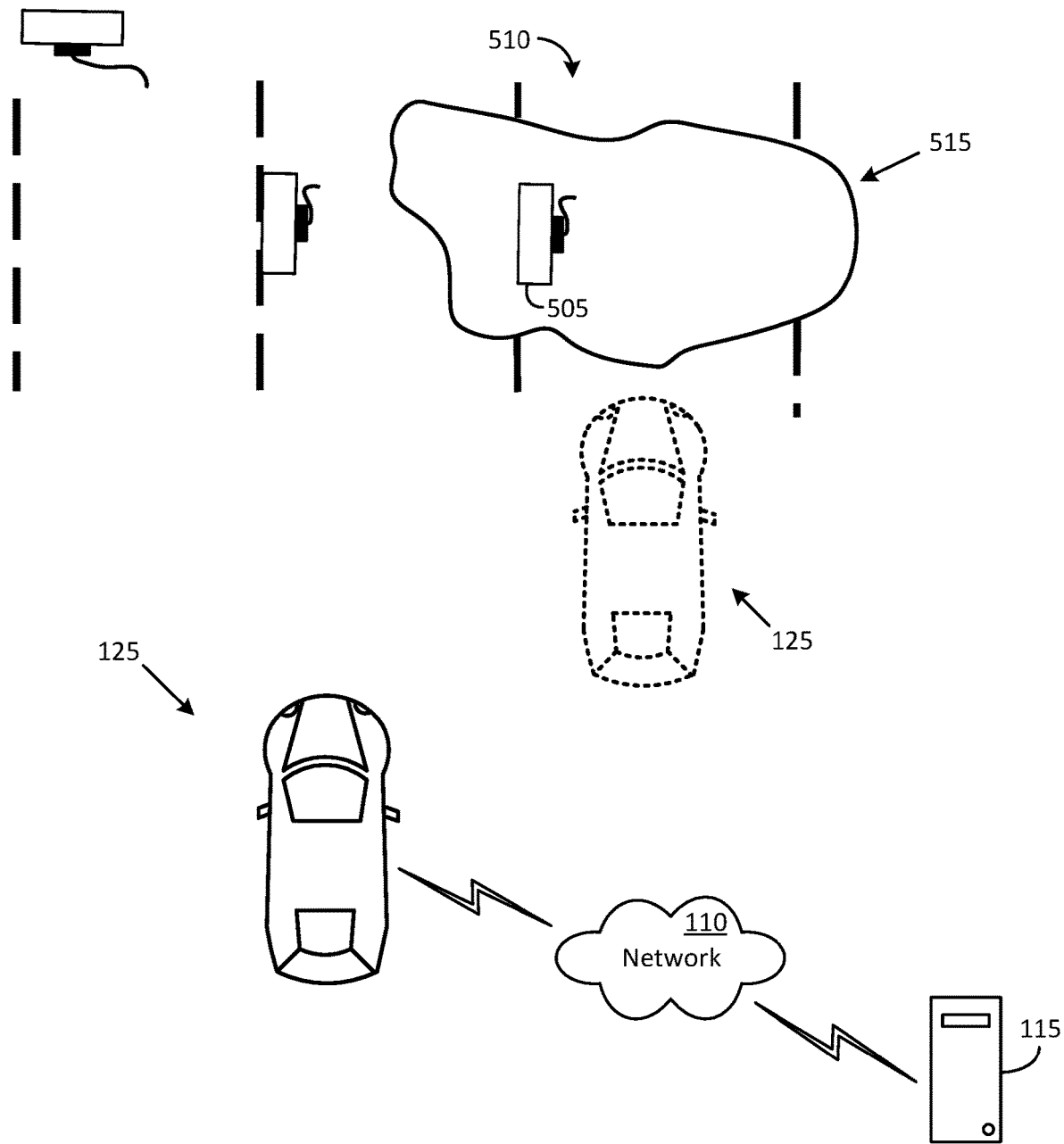
FIG. 5 illustrates a third example battery charging scenario in accordance with an embodiment of the disclosure.

FIG. 5 illustrates a third example battery charging scenario in accordance with an embodiment of the disclosure. In this scenario, the battery charging advisory system 150 may communicate with the server computer 115 (and/or the cloud computer 155) and identify a suitable battery charging station in the manner described above. In this example, the battery charging station 505 is determined to be suitable for charging the battery in the BEV 125.

Before, or during, travel to the parking spot 510, the battery charging advisory system 150 may evaluate images captured by one or more cameras on the BEV 125 and determine that entry into the parking spot 510 is impeded by an impediment in the travel path of the BEV 125. The impediment in this example scenario, is a snowdrift 515 that covers a portion of the parking spot 510 and obscures the markings of the parking spot 510. Faced with this situation, the driver 120 of the BEV 125 may move the BEV into a position from which the snowdrift 515 may be assessed (as indicated by the dashed line outline of the BEV 125).

Assessment of the snowdrift 515 may be performed by operating a device such as, for example, a radar detector or an ultrasonic sensor, in order to obtain information about the amount of snow that is present in the parking spot 510. The amount of snow may be characterized in one case by the depth of the snowdrift 515 from a surface of the snowdrift 515. If the depth of the snowdrift 515 is below a first threshold level, the battery charging advisory system 150 may advise the driver 120 that it is safe to move into the parking spot 510. The advisory, which may be displayed on the display screen of the infotainment system 135 may include a green icon.

If the depth of the snowdrift 515 is above the first threshold level and below a second threshold level, the battery charging advisory system 150 may advise the driver 120 to proceed with caution and use his/her discretion if moving into the parking spot 510. The advisory, which may be displayed on the display screen of the infotainment system 135 may include a yellow or orange icon.

If the depth of the snowdrift 515 is above the second threshold level, the battery charging advisory system 150 may advise the driver 120 against moving into the parking spot 510. The advisory, which may be displayed on the display screen of the infotainment system 135 may include a red icon.

In scenarios where the BEV 125 is an autonomous vehicle, the results of the assessment of the snowdrift 515 by the battery charging advisory system 150 may be conveyed to the vehicle computer 145 (and/or an autonomous vehicle controller in the BEV 125) so as to take responsive action.

In some cases, the battery charging advisory system 150 may communicate with a computer that is operated by an entity such as, for example, a person or an agency that can arrange to have the snowdrift 515 cleared. The person or agency may make arrangements to clear the snowdrift 515 so as to allow the BEV 125 to safely move into the parking spot 510.

Figure 6:
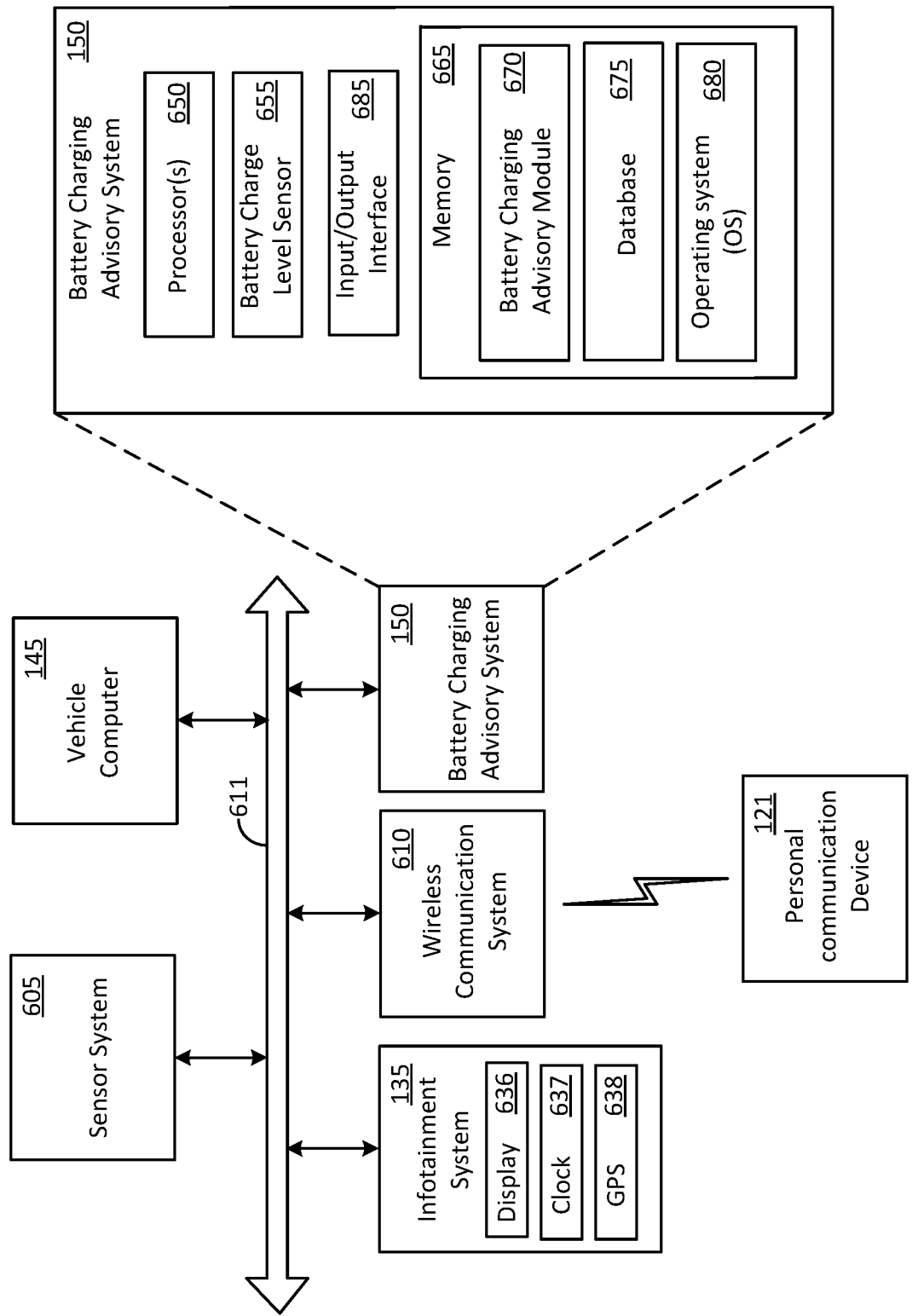
FIG. 6 shows some example components that may be included in a battery electric vehicle in accordance with an embodiment of the disclosure.

FIG. 6 shows some example components that may be provided in the BEV 125 in accordance with an embodiment of the disclosure. It must be understood that the description below with reference to the BEV 125 and the battery charging advisory system 150 is equally applicable to any of various other BEVs and battery charging advisory systems.

The example components in the BEV 125 can include a sensor system 605, the vehicle computer 145, the infotainment system 135, a wireless communication system 610, and the battery charging advisory system 150, which are communicatively coupled to each other via a bus 611. The bus 611 can be implemented using one or more of various wired and/or wireless technologies. For example, the bus 611 can be a vehicle bus that uses a controller area network (CAN) bus protocol, a Media Oriented Systems Transport (MOST) bus protocol, and/or a CAN flexible data (CAN-FD) bus protocol. Some or all portions of the bus 611 may also be implemented using wireless technologies such as Bluetooth®, ZigBee®, Ultra-Wideband (UWB), near-field-communications (NFC), cellular, Wi-Fi, Wi-Fi direct, machine-to-machine communication, and/or man-to-machine communication.

The sensor system 605 may include various sensors and detection devices that are communicatively coupled to the battery charging advisory system 150 and/or the vehicle computer 145. A few examples of such sensors and detection devices can include a camera, an ultrasonic sensor, a radar sensor, a global positioning system (GPS), a battery charge level sensor, a vehicle speed sensor, and/or a vehicle locator device.

The wireless communication system 610 may include elements such as, for example, wireless transmitters and receivers that enable communications between the battery charging advisory system 150 and various devices, such as, for example, the personal communication device 121 of the driver 120, the cloud computer 155, and/or the server computer 115.

The infotainment system 135 can be an integrated unit that includes various components such as, for example, a radio, an MP3 player, a display 636, a clock 637, and a GPS device 638. The display 636 may include a graphical user interface (GUI) for use by the driver 120 to observe information provided by the battery charging advisory system 150 (such as, for example, about various battery charging stations in the battery charging lot 160 and/or a map of the battery charging lot 160) and advisories issued by the battery charging advisory system 150. The GUI may be omitted in some implementations where the BEV 125 is an autonomous vehicle and no input is sought from the occupants of the autonomous vehicle.

The battery charging advisory system 150 may include a processor 650, a battery charge level evaluator 655, an input/output interface 685, and a memory 665. In some implementations, some or all parts of the battery charging advisory system 150 (such as, for example, the processor 650 and the memory 665), may be incorporated into the vehicle computer 145. The memory 665, which is one example of a non-transitory computer-readable medium, may be used to store an operating system (OS) 680 and various code modules such as, for example, a battery charging advisory module 670. The code modules are provided in the form of computer-executable instructions that can be executed by the processor 650 for performing various operations in accordance with the disclosure. More particularly, the battery charging advisory module 670 may be executed by the processor 650 for performing various operations in accordance with the disclosure. The input/output interface 685 may be configured to support transfer of an advisory from the battery charging advisory system 150 to the vehicle computer 145. In one implementation, the advisory may enable the vehicle computer 145 to autonomously maneuver the BEV 125 into a parking position for charging the battery of the BEV 125.

In an example battery charging procedure, the processor 650 may cooperate with the battery charge level evaluator 655 to determine a level of charge in a battery of the BEV 125. The charge level information may be obtained by the battery charge level evaluator 655 from a battery charge level sensor of the sensor system 605. In an example scenario, the battery charging advisory system 150 may determine that a charge level of the battery in the BEV 125 has dropped below a threshold charge level and direct the BEV 125 to a selected battery charging station in the battery charging lot 160. Information for determining items such as, for example, a location of a charging port in the BEV 125 and a type of connector that is compatible with the charging port in the BEV 125, may be obtained by the processor 650 from the database 675 and/or a database of another computer such as the cloud computer 155 and/or the server computer 115.

The database 675 may be used to store various types of information such as for example, a location of a charging port in the BEV 125, a type of connector that is compatible with the charging port in the BEV 125, specifications of a battery of the BEV 125, maps (such as, for example, a map of the battery charging lot 160), and battery charging fees related data.

The example embodiments described above provide indication of certain features and advantages. It should be understood that there are many more features and advantages that can be affected in accordance with the disclosure. For example, the operations described above can be incentivized in various ways such as, for example, by framing the charging procedure in the context of a game (where a driver is rewarded on the basis of his/her performance) and offering credits that can be used for various purposes such as for purchasing products and/or services.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," or "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 650 or the processor 510, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 665, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not in function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
obtaining, by a processor, information about a battery charging lot;
identifying, by the processor and based on the information, a battery charging station having a first charging cable that includes a first type of plug that is compatible for coupling to a charging port of a battery electric vehicle;
providing, by the processor, an advisory for maneuvering the battery electric vehicle into a position that allows coupling of the first charging cable to the charging port of the battery electric vehicle, comprising
identifying, by the processor, a location of the charging port on the battery electric vehicle,
determining, by the processor, based on the location of the charging port on the battery electric vehicle, an orientation of the battery electric vehicle with respect to the battery charging station, and
providing, by the processor, based on the orientation, the advisory for maneuvering the battery electric vehicle into the position that allows coupling of the first charging cable to the charging port of the battery electric vehicle;
detecting, by the processor, an impediment that impedes maneuvering of the battery electric vehicle into the position that allows coupling of the first charging cable to the charging port of the battery electric vehicle;
determining, by the processor, based on the impediment, a re-orientation of the battery electric vehicle with respect to the battery charging station; and
autonomously moving, by a vehicle computer and based on the advisory, the battery electric vehicle into the position.

2. The method of claim 1, wherein providing the advisory for maneuvering the battery electric vehicle into the position that allows coupling of the first charging cable to the charging port of the battery electric vehicle comprises:
determining, by the processor, an availability of the first charging cable for coupling to the charging port of the battery electric vehicle; and providing, by the processor, subject to the availability, the advisory for maneuvering the battery electric vehicle into the position that allows coupling of the first charging cable to the charging port of the battery electric vehicle.

3. The method of claim 1, wherein identifying, by the processor, the battery charging station comprises:
identifying, by the processor, a type of the charging port provided in the battery electric vehicle;
comparing the type of the charging port of the battery electric vehicle to a contact configuration of the first type of plug that is a part of the first charging cable; and
selecting the battery charging station subject to the type of the charging port of the battery electric vehicle matching the contact configuration of the first type of plug.

4. The method of claim 1, wherein the battery electric vehicle is an autonomous vehicle.

5. The method of claim 1, wherein the advisory for maneuvering the battery electric vehicle into the position is provided to a driver of the battery electric vehicle to enable the driver to move the battery electric vehicle into the position.

6. A method comprising:
identifying, by a processor in a first battery charging station, a first charging cable having a first type of plug;
determining, by the processor, whether the first type of plug is compatible with a charging port of a first battery electric vehicle; and
providing, by the processor, subject to the first type of plug being compatible, a first advisory for maneuvering the first battery electric vehicle into a first position that allows coupling of the first charging cable to the charging port of the first battery electric vehicle,
wherein the first type of plug is incompatible with the charging port of the first battery electric vehicle, and wherein the method further comprises:
identifying, by the processor, in a second battery charging station, a second charging cable having a second type of plug;
determining, by the processor, whether the second type of plug is compatible with the charging port of the first battery electric vehicle; and
providing, by the processor, subject to the second type of plug being compatible, a second advisory for maneuvering the first battery electric vehicle into a second position that allows coupling of the second charging cable to the charging port of the first battery electric vehicle; and
autonomously moving, by a vehicle computer and based on the second advisory, the first battery electric vehicle into the second position.

7. A battery electric vehicle comprising:
a battery charging advisory system comprising:
a memory containing computer-executable instructions; and
a processor configured to access the memory and execute the computer-executable instructions to perform operations comprising:
identifying, at a battery charging station, a first charging cable having a first type of plug;
determining whether the first type of plug is compatible with a charging port of a first battery electric vehicle; and
providing, subject to the first type of plug being compatible, a first advisory for maneuvering the first battery electric vehicle into a first position that allows coupling of the first charging cable to the charging port of the first battery electric vehicle,
identifying a location of the charging port on the battery electric vehicle;
determining based on the location of the charging port on the battery electric vehicle, a first orientation of the battery electric vehicle with respect to the battery charging station;
providing, based on the first orientation, the first advisory for maneuvering the battery electric vehicle into the first position;
identifying an impediment that impedes maneuvering of the battery electric vehicle into the first position;
providing, a second advisory for maneuvering the battery electric vehicle into an alternative position that allows coupling of the first charging cable to the charging port of the battery electric vehicle; and
autonomously moving, by a vehicle computer and based on the second advisory, the first battery electric vehicle into the alternative position.

8. The battery electric vehicle of claim 7, further comprising:
a display system that displays the first advisory to enable a driver of the battery electric vehicle to maneuver the first battery electric vehicle into the first position.

9. The battery electric vehicle of claim 8, wherein the display system displays a set of dynamically changing lines that assist the driver to move into the first position when the battery electric vehicle is moving in reverse.

10. The battery electric vehicle of claim 8, wherein the first advisory includes a graphical representation of a location of the charging port on the battery electric vehicle.

11. The battery electric vehicle of claim 7, wherein the battery charging advisory system includes an interface that is configured to support transfer of the first advisory from the battery charging advisory system to a vehicle computer, the first advisory enabling the vehicle computer to autonomously maneuver the first battery electric vehicle into the first position.

12. A method comprising:
identifying, by a processor in a first battery charging station, a first charging cable having a first type of plug;
determining, by the processor, whether the first type of plug is compatible with a charging port of a first battery electric vehicle; and
providing, by the processor, subject to the first type of plug being compatible, a first advisory for maneuvering the first battery electric vehicle into a first position that allows coupling of the first charging cable to the charging port of the first battery electric vehicle,
wherein the first type of plug is compatible with the charging port of the first battery electric vehicle, and wherein the method further comprises:
identifying, by the processor, a non-availability of the first battery charging station;
identifying, by the processor, in a second battery charging station, a second charging cable having a second type of plug;
determining, by the processor, whether the second type of plug is compatible with the charging port of the first battery electric vehicle;
providing, by the processor, subject to the second type of plug being compatible, a second advisory for maneuvering the first battery electric vehicle into a second position that allows coupling of the second charging cable to the charging port of the first battery electric vehicle; and autonomously moving, by a vehicle computer and based on the second advisory, the first battery electric vehicle into the second position.

13. A method comprising:

identifying, by a processor in a first battery charging station, a first charging cable having a first type of plug;

determining, by the processor, whether the first type of plug is compatible with a charging port of a first battery electric vehicle; and providing, by the processor, subject to the first type of plug being compatible, a first advisory for maneuvering the first battery electric vehicle into a first position that allows coupling of the first charging cable to the charging port of the first battery electric vehicle wherein the first type of plug is compatible with the charging port of the first battery electric vehicle, and wherein the method further comprises:

identifying, by the processor, a lack of access to the first battery charging station for coupling the first charging cable to the charging port of the first battery electric vehicle;

identifying, by the processor, in a second battery charging station, a second charging cable having a second type of plug;

determining, by the processor, whether the second type of plug is compatible with the charging port of the first battery electric vehicle;

providing, by the processor, subject to the second type of plug being compatible, a second advisory for maneuvering the first battery electric vehicle into a second position that allows coupling of the second charging cable to the charging port of the first battery electric vehicle; and autonomously moving, by a vehicle computer and based on the second advisory, the first battery electric vehicle into the second position.

14. A method comprising:

identifying, by a processor in a first battery charging station, a first charging cable having a first type of plug;

determining, by the processor, whether the first type of plug is compatible with a charging port of a first battery electric vehicle; and providing, by the processor, subject to the first type of plug being compatible, a first advisory for maneuvering the first battery electric vehicle into a first position that allows coupling of the first charging cable to the charging port of the first battery electric vehicle, wherein the first type of plug is compatible with the charging port of the first battery electric vehicle, and wherein the method further comprises:

detecting, by the processor, an impediment that impedes maneuvering of the first battery electric vehicle into the first position that allows coupling of the first charging cable to the charging port of the first battery electric vehicle;

determining, by the processor, based on the impediment, a re-orientation of the first battery electric vehicle with respect to the first battery charging station;

providing, by the processor, a second advisory for maneuvering the first battery electric vehicle into a second position that allows coupling of the first charging cable to the charging port of the first battery electric vehicle;

autonomously moving, by a vehicle computer and based on the second advisory, the first battery electric vehicle into the second position.

15. The method of claim 14, wherein the impediment is one of a second battery electric vehicle or an accumulation of snow.

\* \* \* \* \*